(12) United States Patent
Bolden

(10) Patent No.: US 7,648,541 B2
(45) Date of Patent: Jan. 19, 2010

(54) DESULFURISATION OF FUEL

(75) Inventor: Roger Bolden, East Ivanhoe (AU)

(73) Assignee: Ceramic Fuel Cells Limited, Victoria (AU)

( * ) Notice: Subject to any disclaimer, the term of this patent is extended or adjusted under 35 U.S.C. 154(b) by 137 days.

(21) Appl. No.: 10/502,204

(22) PCT Filed: Jan. 24, 2003

(86) PCT No.: PCT/AU03/00080

§ 371 (c)(1),
(2), (4) Date: Oct. 21, 2004

(87) PCT Pub. No.: WO03/063282

PCT Pub. Date: Jul. 31, 2003

(65) Prior Publication Data

US 2005/0106428 A1     May 19, 2005

(30) Foreign Application Priority Data

Jan. 25, 2002   (AU) .................................. PS0147

(51) Int. Cl.
| | |
|---|---|
| *B01J 7/00* | (2006.01) |
| *H01M 8/06* | (2006.01) |
| *C01B 3/36* | (2006.01) |
| *C10J 3/46* | (2006.01) |
| *C10J 3/54* | (2006.01) |
| *C10G 45/00* | (2006.01) |
| *C10G 25/00* | (2006.01) |
| *C10G 45/04* | (2006.01) |
| *C10G 45/60* | (2006.01) |

(52) U.S. Cl. .................... 48/197 R; 48/61; 208/209; 208/213

(58) Field of Classification Search ................ 48/197 R
See application file for complete search history.

(56) References Cited

U.S. PATENT DOCUMENTS 3,898,153 A * 8/1975 Louder et al. ................. 208/89

(Continued)

FOREIGN PATENT DOCUMENTS

EP          435736 B         7/1991

(Continued)

OTHER PUBLICATIONS

JPO English Abstracts of JP-04280080 (Oct. 6, 1992) and 09-013060 (Jan. 14, 1997).*

(Continued)

*Primary Examiner*—Jennifer K Michener
*Assistant Examiner*—Matthew J Merkling
(74) *Attorney, Agent, or Firm*—Birch, Stewart, Kolasch & Birch, LLP

(57) ABSTRACT

A method of removing sulfur from a fuel supply stream for a fuel cell (1), which method comprises: (a) hydrogenating the fuel supply stream (1) by contacting it with a hydrogenation catalyst in the presence of hydrogen to convert sulfur-containing compounds in the fuel supply stream (1) into hydrogen sulfide; (b) removing the hydrogen sulfide to produce a desulfurised fuel stream; and (c) pre-reforming the desulfurised fuel stream to produce a fuel cell feed stream, wherein a portion of the fuel cell feed stream is processed to increase its hydrogen content to produce a hydrogen-enriched fuel stream which is used in step (a) as a source of hydrogen to hydrogenate the fuel supply stream (1).

4 Claims, 1 Drawing Sheet

U.S. PATENT DOCUMENTS

Figure 1:
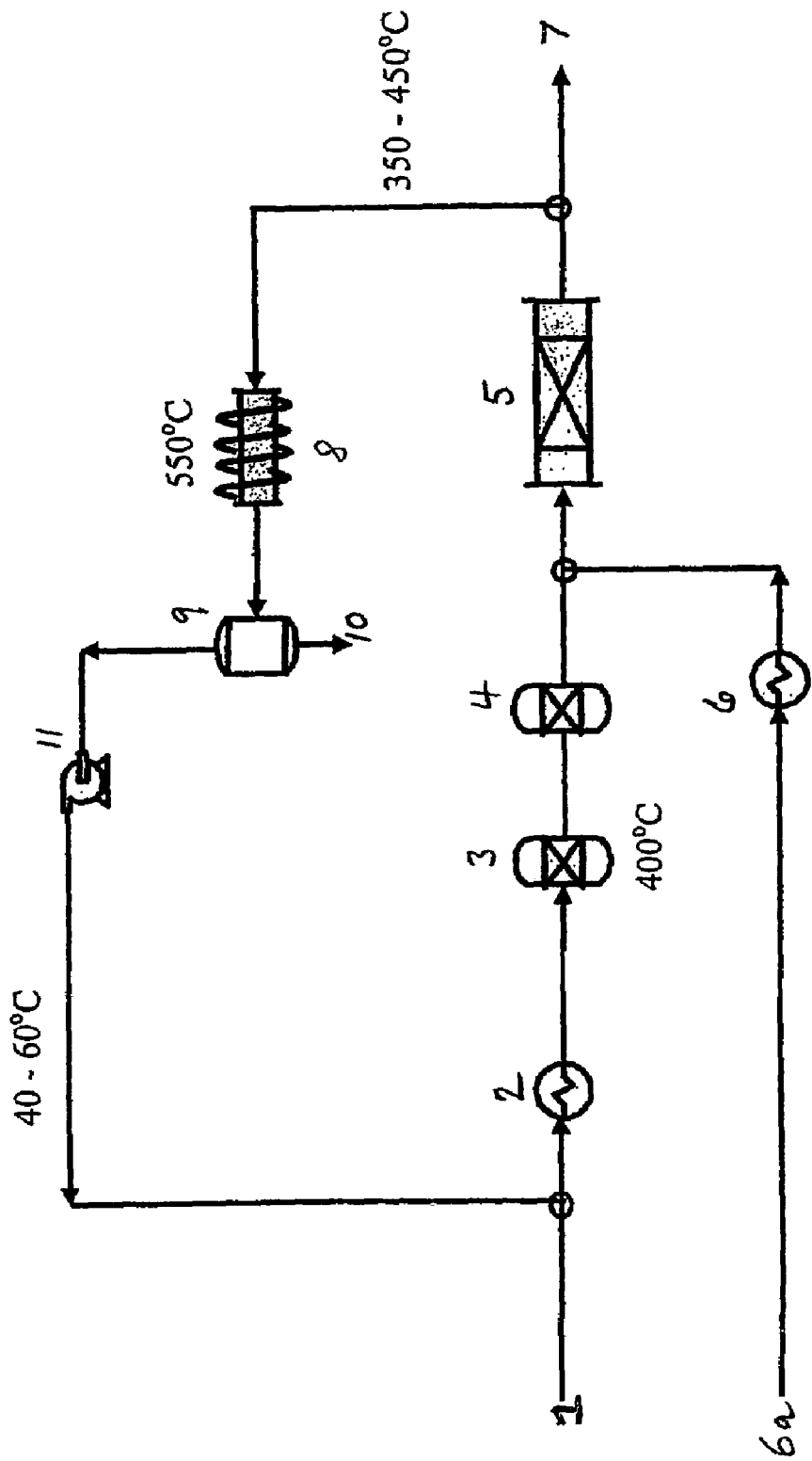

| | | | |
|---|---|---|---|
| 4,181,503 A | | 1/1980 | Lesieur et al. |
| 5,124,140 A | * | 6/1992 | Okada et al. ................. 423/650 |
| 5,292,428 A | * | 3/1994 | Harrison et al. ......... 208/208 R |
| 5,360,679 A | * | 11/1994 | Buswell et al. ................ 429/19 |
| 5,366,614 A | * | 11/1994 | Russ et al. .................... 208/65 |
| 5,595,833 A | * | 1/1997 | Gardner et al. ................ 429/19 |
| 5,686,196 A | * | 11/1997 | Singh et al. ................... 429/17 |
| 5,769,909 A | * | 6/1998 | Bonk et al. ................. 48/127.9 |
| 6,159,256 A | * | 12/2000 | Bonville et al. ................ 48/61 |
| 6,299,994 B1 | * | 10/2001 | Towler et al. ................. 429/17 |
| 7,128,768 B2 | * | 10/2006 | Liu et al. ....................... 48/61 |
| 2002/0165417 A1 | * | 11/2002 | Numaguchi et al. ......... 585/310 |

FOREIGN PATENT DOCUMENTS

| | | | |
|---|---|---|---|
| JP | 04280080 A | * | 10/1992 |
| JP | 09013060 A | * | 1/1997 |
| JP | 11045732 A | | 2/1999 |

OTHER PUBLICATIONS

Certified Translation (via Schreiber Translations Inc.) of JP-04280080 A (Oct. 2007).*

Certified Translation (via Academy Translations) of JP-04280080 A (Feb. 8, 2008).*

* cited by examiner

DESULFURISATION OF FUEL

The present invention relates to treatment of a fuel supply for a fuel cell electrical power generating system and, in particular, to the removal of sulfur from the fuel supply.

Fuel cells convert gaseous fuels via an electrochemical process directly into electricity. Typically, the fuel used contains sulfur in the form of hydrogen sulfide and organic sulfur-containing compounds such as mercaptans, and it is important to remove the sulfur from the fuel to avoid poisoning of catalysts used downstream in systems of the fuel cell. Conventional desulfurisation systems include hydrodesulfurisers consisting of a hydrogenation catalyst to convert the sulfur-containing compounds to hydrogen sulfide and a hydrogen sulfide absorbent bed. The hydrogenation catalyst of the hydrodesulfuriser requires a continuous supply of hydrogen in order to effect conversion of the sulfur-containing compounds to hydrogen sulfide.

There is a continuing desire to improve the overall efficiency of fuel cell systems and the present invention seeks to do so by innovation in the way in which sulfur is removed from fuel for such systems.

Accordingly, the present invention provides a method of removing sulfur from a fuel supply stream for a fuel cell, which method comprises:

(a) hydrogenating the fuel supply stream by contacting it with a hydrogenation catalyst in the presence of hydrogen to convert sulfur-containing compounds in the fuel supply stream into hydrogen sulfide;

(b) removing the hydrogen sulfide to produce a desulfurised fuel stream; and (c) pre-reforming the desulfurised fuel stream to produce a fuel cell feed stream, wherein a portion of the fuel cell feed stream is processed to increase its hydrogen content to produce a hydrogen-enriched fuel stream which is used in step (a) as a source of hydrogen to hydrogenate the fuel supply stream.

The crux of the present invention resides in producing a hydrogen-enriched fuel stream and using this fuel stream to supply hydrogen for hydrogenation of the initial fuel supply stream. In other words, the present invention is based on internal hydrogen generation and, in particular, hydrogen intensification to produce the hydrogen required to effect hydrodesulfurisation of the fuel supply stream.

The present invention also provides a fuel processing system useful for carrying out the method described above. The system comprises:

hydrogenation means comprising a hydrogenation catalyst;

hydrogen sulfide removal means provided downstream from and in communication with the hydrogenation means;

a pre-reformer provided downstream from and in communication with the hydrogen sulfide removal means; and hydrogen intensifier means which is provided downstream from and in communication with the pre-reformer and upstream from and in communication with the hydrogenation means, wherein the hydrogen intensifier means receives a portion of the output from the pre-reformer.

It will be appreciated from the foregoing that the hydrogen intensifier means is provided as part of a loop which returns a portion of the output stream of the pre-reformer (denoted the "fuel cell feed stream" herein) to the input stream (denoted the "fuel supply stream" herein) of the hydrogenation means. A portion of the output stream which is not returned to the hydrogenation means is delivered to (the anode of) the fuel cell.

The present invention also provides a fuel cell system comprising a fuel processing system as described above and a fuel cell provided downstream from and in communication with the pre-reformer. The fuel cell uses a portion of the fuel cell feed stream as fuel.

Unless the context otherwise permits, herein reference to a fuel cell means a fuel cell which is capable of internally reforming methane to hydrogen at the anode of the cell. The electrochemical electricity generating reactions within the cell are exothermic whereas the internal reforming reaction is endothermic. The amount of methane delivered to the anode may therefore be controlled in order to achieve thermal management of the fuel cell, depending upon the load requirements of the fuel cell. The concentration of methane delivered to the anode of the fuel cell may be manipulated by varying the temperature at which the pre-reformer is operated. Under conditions of high load, the temperature of the fuel cell will increase and a relatively high concentration of methane is required for internal reforming on the anode to achieve greater cooling. In this case the pre-reformer would be operated at relatively low temperature. The opposite is true when the fuel cell is operating under low load. The kind of conditions under which the pre-reformer would operate are discussed in more detail below.

It will be appreciated from the foregoing that it is essential in accordance with the present invention that a portion of the fuel cell feed stream is processed in order to increase its hydrogen content and a portion of the same stream is delivered to (the anode of) the fuel cell, i.e the fuel cell feed stream from the pre-reformer is split. Production of a feed stream enriched in hydrogen is unnecessary when using a fuel cell the anode of which is capable of internal reforming of methane. Splitting of the fuel cell feed stream affords generation of a hydrogen enriched stream for use in the hydrogenation means whilst retaining a suitable feed stream for internal reforming of methane at the anode of the fuel cell. The present invention is therefore fundamentally different from systems in which the fuel cell does not have internal reforming capability and in which all of the output of the pre-reformer is processed to increase its hydrogen content followed by division of the resultant hydrogen rich stream between upstream hydrogenation means and downstream fuel cell anode.

The various components of the fuel processing and fuel cell systems described herein are in communication with each other by means of conventional gas supply conduits. These may also include ancillary components such as heat exchangers, control valves, manifolds, pumps and condensers, as necessary. The terms "upstream" and "downstream" are intended to reflect the positions of the various functional means of the systems relative to each other. The accompanying figure also illustrates this.

The fuel supply stream may comprise any (sulfur-containing) fuel which is typically used in fuel cell systems and which may be pre-reformed to generate methane. Thus, the fuel may be a higher ($C_{2+}$) hydrocarbon fuel such as gasoline, diesel, kerosene, naphtha or LPG. Typically, the fuel supply stream will be natural gas. This is predominantly methane with small quantities of higher hydrocarbons.

In accordance with the present invention, in a first stage, the fuel supply stream is hydrogenated by contacting the stream with a hydrogenation catalyst in the presence of hydrogen. This may be achieved using conventional equipment and processing conditions. Conventional hydrogenation catalysts such a Co—Mo catalysts may be used. Prior to hydrogenation the fuel supply stream is typically heated using a pre-heater so that the input stream for hydrogenation is at a suitable temperature for the hydrogenation catalyst being used. When using Co—Mo the input stream may have a temperature of approximately 400° C. Hydrogenation results in conversion of sulfur-containing compounds present in the fuel supply stream into hydrogen sulfide and sulfur-free hydrocarbons.

Subsequent to hydrogenation the hydrogen sulfide is removed to produce a desulfurised fuel stream. This removal is typically achieved by contacting with a hydrogen sulfide absorbent bed. Conventional hydrogen sulphide absorbents may be used, for example ZnO. When ZnO is used ZnS is formed according to the reaction:

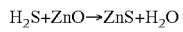

$$H_2S+ZnO \rightarrow ZnS+H_2O$$

Continued reaction leads to consumption of the absorbent so that it must be changed periodically. The sulfur in its absorbed form may be discarded or used for further chemical processing absorb.

Hydrodesulfurisation results in a desulfurised fuel stream which is then delivered to a pre-reformer. Prior to delivery to the pre-reformer the sulfur content of the fuel is typically reduced to a level of less than about 1 part per million by weight, and preferably to less than 0.2 parts per million by weight.

The desulfurised fuel stream is then pre-reformed and this may take place in a steam pre-pre-reformer. In the present invention the desulfurised fuel stream is not usually fully reformed. The primary function of the pre-reformer is to remove higher hydrocarbons and produce a methane and steam rich stream, with varying levels of methane depending upon the operating temperature of the pre-former and based on the load requirements of the fuel cell as discussed above. The pre-reforming operation may be carried out in conventional manner. Steam pre-reforming is conveniently performed at atmospheric pressure, but higher pressures may be adopted if desired, for example up to about 1000 kPa. Steam pre-reforming is usually performed at a temperature no greater than 450° C., more preferably in a range of about 250-450° C. and, dependent upon the fuel and other process parameters, most usually in a range of about 300-400° C. Under low load the temperature is likely to be increased up to 600° C. In the pre-reformer higher hydrocarbons are reformed to form methane, carbon monoxide, carbon dioxide and hydrogen.

Generally, the steam pre-reforming process will be carried out such that the higher hydrocarbon fuel is resident over the pre-reforming catalyst for a sufficient time to ensure at least substantially complete conversion of the higher hydrocarbons. This alleviates deposition of carbon on the anode in the downstream fuel cell when hydrocarbons are reformed on the anode. However, some higher hydrocarbons may be present in the output fuel stream and preferably there is 97.5% or greater conversion of hydrocarbons in the steam pre-reforming process. More preferably, there is no more than about 0.1% by volume higher hydrocarbons present in the fuel stream to the anode measured on a wet basis.

A variety of conventional steam pre-reformers are known and any of these may be used. The common pre-reformer catalyst is nickel-based, but may comprise, for example, platinum, rhodium, other precious metals or a mixture of any of these.

A portion of the pre-reformer output (the "fuel cell feed stream") is used to supply hydrogen to the hydrodesulfuriser operation. The key to this step is hydrogen intensification that portion of the fuel cell feed stream. This is achieved by feeding a portion of the fuel cell feed stream to a hydrogen intensifier where further reforming of the stream takes place resulting in increased hydrogen content. The hydrogen intensifier contains any conventional commercially available reforming catalyst and this typically operates at elevated temperature (generally from 500-600° C. but quite possibly higher, for example up to about 850° C.). To maintain the hydrogen intensifier at the requisite temperature, an electrical heating band may be used. Following hydrogen intensification the hydrogen-enriched fuel stream typically has a hydrogen content of 30 to 60%, more preferably of 50 to 60%, by volume.

The hydrogen-enriched stream is then preferably cooled and excess water removed. This has the advantage of further intensifying the hydrogen concentration of the stream and of reducing the impact of moisture on the effectiveness of the hydrogen sulfide absorbent. Cooling of the stream also enables a low temperature pump or recycle blower to be used. Typically, cooling is achieved using a conventional condenser unit provided with a condensate trap. A low temperature pump or recycle blower, typically operating at a fixed rate, may be used to recirculate the hydrogen-enriched fuel stream as an input of the hydrodesulfuriser operation. The hydrogen-enriched fuel stream is usually mixed with the fuel supply stream prior to hydrogenation thereof. Alternatively, the hydrogen-enriched fuel stream may be fed directly to the hydrogenation catalyst as a separate input to the fuel supply stream.

The accompanying non-limiting figure illustrates an embodiment of the present invention. In the figure a fuel supply stream (1), such as natural gas, is fed via a fuel pre-heater (2) to a hydrodesulfuriser unit (3,4). The hydrodesulfuriser unit includes a hydrogenation unit (3) provided with a hydrogenation catalyst (such as a Co—Mo catalyst) and, downstream, a hydrogen sulfide absorbent bed (4), such as zinc oxide, operating at around 400° C. In the figure the hydrogenation unit (3) and hydrogen sulfide absorbent bed (4) are shown as separate components of the system. In practice these components may be combined in a single vessel by mixing or staging of the hydrogenation catalyst and absorbent. Following hydrodesulfurisation a desulfurised fuel stream is fed to a pre-reformer (5). At full load the pre-reformer may be operated in an adiabatic manner and under low load conditions electrical heating, or the like, may be employed. A steam generator (6) fed with demineralised water (6a) provides steam to the pre-reformer (5). Following pre-reformation a fuel cell feed stream is produced, a portion of which is passed to the anodes of a fuel cell stack (7). The anodes are capable of reforming methane to hydrogen. A portion of the fuel cell feed stream is tapped off and fed to a hydrogen intensifier (8) operating at a temperature of around 550° C. The output of the hydrogen intensifier is then cooled in a condenser (9) and condensate (10) removed. The hydrogen-enriched fuel stream produced is recirculated by a hydrogen recycle blower (11) and mixed with the fuel supply stream (1) prior to the latter being fed to the hydrodesulfuriser unit (3,4) where the hydrogen in the hydrogen-enriched fuel stream effects hydrogenation of the fuel supply stream (1) in the hydrogenation unit (3). The hydrogen-enriched fuel stream may also be recirculated using ejectors or by connection upstream of a fuel pressure booster. Conceivably, if the intensifier is run at high temperature and an ejector or booster is used, the condenser (9) and or the recycle blower (11) may be disposed of.

On start up there will not be any pre-reformer output so that there will not be any hydrogen available for the hydrodesulfurisation operation. The level of hydrogen in the fuel supply stream is likely to be insufficient to provide effective hydrogenation. Initially at least, this means that hydrodesulfurisation of the fuel supply stream is inefficient when compared with when the pre-reformer output is recirculated (with reformation and hydrogen intensification) to the hydrodesulfurisation operation. In practice, the system of the present invention may be designed to take this lag in pre-reformer output into account. The quantity of the catalysts used downstream in the fuel processing and fuel cell systems are typically chosen to take into account that there may be some sulfur slippage and catalyst degradation on start up. Thus, the pre-reformer catalyst may be oversized. Alternatively, a cold desulfuriser such as activated carbon may be used on start-up. Once started it is envisaged that the fuel processing system will be run continuously to avoid recurrence of the start up problem. Typically, the system will be run under low load/idling load as opposed to being shut down.

Typically, the concentration of hydrogen returned to the fuel supply stream to effect hydrodesulfurisation is in excess of that actually required based on the sulfur content of the fuel. The hydrogen concentration of the stream returned to the hydrodesulfurisation operation may be controlled and adjusted, for instance to suit the quality and type of the fuel supply stream. The hydrogen concentration may be manipulated by adjusting the temperature at which the hydrogen intensifier (reformer) is operated or by varying the rate of its supply from the fuel cell feed stream. For instance, in the type of system illustrated in the accompanying figure, when the operating temperature of the hydrogen intensifier is 550° C. and 600° C. respectively, for a feed input hydrogen content of 7.5 to 13%, the hydrogen content in the output from the hydrogen intensifier will be around 37% and 47% respectively, which after condensation gives a hydrogen content of around 53% and 58% respectively. Thus, the temperature of the hydrogen intensifier/reformer may be used to manipulate the hydrogen content in the output stream, and this may be further enhanced by condensation to remove water vapour.

The fuel cell used in practice of the present invention is typically a solid oxide fuel cell (SOFC) in which the fuel cell anodes are capable of internally reforming methane in order to generate hydrogen and carbon monoxide. SOFCs tends to be regarded as the most efficient and versatile power generation systems, in particular for dispersed power generation, with low pollution, high efficiency, high power density and fuel flexibility. SOFCs operate at elevated temperatures, for example 700-1000° C. Other fuel cells which operate at elevated temperatures include the molten carbonate fuel cell requiring a minimum temperature of 650° C. However, SOFCs are the primary interest for the invention and discussion herein will be mainly directed to these without intending to be limited in any way.

Numerous SOFC configurations exist, including the tubular, the monolithic and the planar design. Single planar SOFCs are connected via interconnects or gas separators to form multi-cell units, sometimes termed fuel cell stacks. Gas flow paths are provided between the gas separators and respective electrodes, for example by providing gas flow channels in the gas separators. In a fuel cell stack the components—electrolyte/electrode laminates and gas separator plates are fabricated individually and then stacked together. With this arrangement, external and internal co-flow, counter-flow and cross-flow manifolding options are possible of the gaseous fuel and oxidant.

Preferably, the anode in the fuel cell comprises a nickel material, such as a nickel/zirconia cermet, which is used to catalyse the reforming reaction in the fuel cell. The fuel cell and its associated assembly can take any suitable form provided it operates at a temperature of at least 650° C. to provide at least substantial conversion of the methane in the internal reforming reaction. By way of example only, several different planar SOFC components and systems, SOFCs and materials are described in our International Patent Applications PCT/AU/96/00140, PCT/AU96/00594, PCT/AU98/00437, PCT/AU98/00719 and PCT/AU98/00956, the contents of which are incorporated herein by reference, including the corresponding US national phase patent U.S. Pat. No. 5,942,349 and patent application Ser. Nos. 09/155,061, 09/445,735, 09/486,501 and 09/554,709, respectively. Other disclosures appear in our International patent applications PCT/AU99/01140, PCT/AU00/00630 and PCT/AU00/00631.

Generally, the fuel cell to which the fuel stream is supplied will be one of multiple fuel cells to which the fuel stream is also supplied, commonly called a fuel cell stack in the case of planar SOFCs, and it is envisaged that a fuel cell stack will be employed in practice of the present invention. However, the invention also extends to the process being performed using a single fuel cell.

The invention claimed is:

1. A method of removing sulfur from a fuel supply stream for a fuel cell that is capable internally reforming methane to hydrogen at an anode of the fuel cell, which method comprises the step:
   (a) hydrogenating the fuel supply stream by contacting it with a hydrogenation catalyst in the presence of hydrogen to convert sulfur-containing compounds in the fuel supply stream into hydrogen sulfide;
   (b) removing the hydrogen sulfide to produce a desulfurised fuel stream;
   (c) pre-reforming the desulfurised fuel stream in a steam pre-reformer at a temperature no greater than 450° C. to convert higher hydrocarbons in the fuel supply stream and to produce a cell feed stream for delivery to the fuel cell that comprises steam and an amount of methane, the amount of methane being dependent upon the load requirements of the fuel cell;
   (d) splitting the fuel cell feed stream into a first portion that is a suitable feed stream for internal reforming of methane at an anode of the fuel cell and a second portion;
   (e) delivering the first portion of the fuel cell feed stream to the anode of the fuel cell;
   (f) processing the second portion of the fuel cell feed stream using a reformer operated at a temperature of 500 to 850° C. to increase the hydrogen content of the fuel cell feed stream to produce a hydrogen-enriched fuel stream;
   (g) cooling and removing excess water from the hydrogen-enriched fuel stream produced in step (f) to produce a cooled and dehydrated hydrogen-enriched fuel stream; and
   (h) using the cooled and dehydrated hydrogen-enriched fuel stream produced in step (g) as a source hydrogen to hydrogenate the fuel supply stream in step (a) by mixing the hydrogen-enriched fuel stream with the fuel supply stream prior to hydrogenation in step (a).

2. A method according to claim 1, wherein the fuel supply stream is gasoline, diesel, kerosene, naphtha, LPG or natural gas.

3. A fuel processing system comprising:
   hydrogenation means comprising a hydrogenation catalyst;
   hydrogen sulfide removal means provided downstream from and in communication with the hydrogenation means;
   a steam pre-reformer provided downstream from and in communication with the hydrogen sulfide removal means, the steam pre-reformer having a maximum operating temperature no greater than 450° C.;

a reformer operable at a temperature of 500 to 850° C. which is provided downstream from and in communication with the steam pre-reformer, upstream from and in communication with the hydrogenation means and upstream in communication with a fuel cell that is capable of internal reforming of methane at an anode of the fuel cell;

a divider to split the output of the steam pre-reformer into a first portion that is to be delivered to the anode of the fuel cell and a second portion that is to be delivered to the reformer, while in use the divider splitting the output of the steam pre-reformer to ensure that the first portion is suitable for delivery to the anode of the fuel cell based upon the load requirements of the fuel cell; and cooling means and excess water removal means provided downstream from and in communication with the reformer wherein the cooling means and excess water removal means receive the output of the reformer.

4. A fuel cell system comprising the fuel processing system of claim 3 and a fuel cell provided downstream from and in communication with the steam pre-reformer, the anode of the fuel cell receiving a portion of the output of the steam pre-reformer based upon the load requirements of the fuel cell.

* * * * *